(12) United States Patent
Harrison (10) Patent No.: US 12,397,769 B2
(45) Date of Patent: Aug. 26, 2025

(54) METHOD OF ADJUSTMENT DURING STABILITY CONTROL OF A VEHICLE

(71) Applicant: Haldex Brake Products AB, Landskrona (SE)

(72) Inventor: Dudley Harrison, Lindley (GB)

(73) Assignee: Haldex Brake Products AB, Landskrona (SE)

( * ) Notice: Subject to any disclaimer, the term of this patent is extended or adjusted under 35 U.S.C. 154(b) by 580 days.

(21) Appl. No.: 17/001,924

(22) Filed: Aug. 25, 2020

(65) Prior Publication Data
US 2021/0078561 A1    Mar. 18, 2021

(30) Foreign Application Priority Data
Sep. 18, 2019 (GB) ..................................... 1913472

(51) Int. Cl.
*B60T 17/22* (2006.01)
*B60T 8/171* (2006.01)
*B60T 8/1755* (2006.01)

(52) U.S. Cl.
CPC ............ *B60T 17/221* (2013.01); *B60T 8/171* (2013.01); *B60T 8/1755* (2013.01); *B60T 2250/04* (2013.01); *B60T 2270/406* (2013.01)

(58) Field of Classification Search
CPC ...... B60T 17/221; B60T 8/171; B60T 8/1755; B60T 2250/04; B60T 2270/406; B60R 21/0132
See application file for complete search history.

(56) References Cited

U.S. PATENT DOCUMENTS 5,681,992 A * 10/1997 Klein ..................... B60T 17/22
73/132
7,233,236 B2 * 6/2007 Lu ............................. B60T 8/00
180/197

(Continued)

FOREIGN PATENT DOCUMENTS

DE  102011111862  2/2012
GB  2454224  5/2005

(Continued)

OTHER PUBLICATIONS

"Chen, Shih-Ken; Moshchuk, Nikolai; Nardi, Flavio; Ryu, Jihan; Vehicle Rollover Avoidance; August 2010; IEEE Control Systems Magazine: Aug. 2010" (Year: 2010).*

(Continued)

*Primary Examiner* — Peter D Nolan
*Assistant Examiner* — Christopher R Cardimino
(74) *Attorney, Agent, or Firm* — Price Heneveld LLP (57) ABSTRACT

A method of adjusting test braking pulses during stability control of a vehicle (10) including the steps of: applying a first test braking pulse to at least one wheel of the vehicle (10), the application of the test braking pulse comprising operating a brake actuator (112) to apply a low level braking pressure of the wheel, determining a first longitudinal acceleration ($A_{Long1}$) of the vehicle (10) during the test braking pulse, obtaining a second longitudinal acceleration ($A_{Long2}$) indicative of the longitudinal acceleration of the vehicle (10) when a test braking pulse is not being applied, calculating a change in longitudinal acceleration during the test braking pulse, and determining whether the change in longitudinal acceleration is acceptable, and if not, adjusting the level of the braking pressure applied in a subsequent test braking pulse.

18 Claims, 3 Drawing Sheets

(56) References Cited

U.S. PATENT DOCUMENTS

| | | | | |
|---|---|---|---|---|
| 7,302,331 | B2* | 11/2007 | Meyers | B60T 8/243 |
| | | | | 701/90 |
| 7,522,985 | B2* | 4/2009 | Fiedler | B60T 8/885 |
| | | | | 701/79 |
| 8,086,376 | B2* | 12/2011 | McCoy | B60R 21/0134 |
| | | | | 340/440 |
| 8,843,275 | B2* | 9/2014 | Foo | B60R 16/0233 |
| | | | | 701/45 |
| 9,446,746 | B2* | 9/2016 | Harrison | B60T 8/1708 |
| 9,969,370 | B2* | 5/2018 | Risse | B60T 13/385 |
| 11,130,481 | B2* | 9/2021 | Wulf | B60T 13/683 |
| 11,198,417 | B2* | 12/2021 | Dieckmann | B60T 8/171 |
| 2014/0358395 | A1* | 12/2014 | Harrison | B60T 8/17554 |
| | | | | 701/78 |
| 2020/0247373 | A1* | 8/2020 | VanAntwerp | B60T 8/17551 |

FOREIGN PATENT DOCUMENTS

| | | | |
|---|---|---|---|
| GB | 2499438 | 8/2013 | |
| JP | 2005313879 A * | 11/2005 | ............ B60T 8/1708 |
| WO | 2018192737 | 10/2018 | |

OTHER PUBLICATIONS

"Rossey, Mike; Test Method for Simulating Vehicle Rollover; 2001; SAE Transactions, 2001, Vol. 110, Section 6: Journal Of Passenger Car:Mechanical Systems Journal (2001), pp. 436-440" (Year: 2001).*
GB1913472.5, Search Report Under Section 17(5), Feb. 11, 2020, 3 pages.
GB1913472.5 Examination Report, Mar. 20, 2023.

\* cited by examiner

METHOD OF ADJUSTMENT DURING STABILITY CONTROL OF A VEHICLE

The present invention relates to a method of adjusting test braking pulses during stability control of a vehicle.

When a vehicle, in particular a heavy goods vehicle, rounds a corner, if the speed of the vehicle is sufficiently high, forces on the vehicle during cornering can cause the vehicle wheels on the inside of the corner to lift (i.e. unload weight) from the road. In some conditions, this can cause vehicles to roll over/overturn. It is known to provide an automatic stability control system which acts to assess whether the vehicle is at risk of overturning and intervening to prevent, or at least reduce the risk of, such an event from occurring. The intervention is usually an application of one or more brakes or throttling of the engine, so as to result in the vehicle speed being reduced.

Typically, assessing whether the vehicle is at risk of overturning includes the application of one or more low level brake pulses. However, such stability control systems are usually implemented in vehicles with electronic braking systems (EBS) as such systems provide for electronically controlled application of vehicle brakes. Vehicles fitted only with anti-lock braking systems (ABS) but no EBS often lack a stability control system because they lack the required infrastructure to provide electronically initiated application of the vehicle brakes. A method of implementing a control stability method in a vehicle with ABS, but no EBS, is described in patent GB2499438.

Embodiments of the present invention aim to alleviate one or more problems with the prior art.

According to a first aspect of the invention we provide a method of adjusting test braking pulses during stability control of a vehicle including the steps of: applying a first test braking pulse to at least one wheel of the vehicle, the application of the test braking pulse comprising operating a brake actuator to apply a low level braking pressure of the wheel, determining a first longitudinal acceleration of the vehicle during the test braking pulse, obtaining a second longitudinal acceleration indicative of the longitudinal acceleration of the vehicle when a test braking pulse is not being applied, calculating a change in longitudinal acceleration during the test braking pulse, and determining whether the change in longitudinal acceleration is acceptable, and if not, adjusting the level of the braking pressure applied in a subsequent test braking pulse.

The step of obtaining the second longitudinal acceleration may include a step of determining the longitudinal acceleration either before or after the test braking pulse has been applied. The step of determining the second longitudinal acceleration may be performed within 1 s of the test braking pulse being applied.

The step of determining the first longitudinal acceleration may include measuring the longitudinal acceleration of the vehicle over first predetermined time period. The step of determining the second longitudinal acceleration may include measuring the longitudinal acceleration of the vehicle over a second predetermined time period. The predetermined time period over which the second longitudinal acceleration is measured may be longer than the predetermined time period over which the first longitudinal acceleration is measured.

The step of determining the second longitudinal acceleration may include calculating an average longitudinal acceleration over the second predetermined time period. The second predetermined time period may be between 200 ms and 800 ms (and may be 600 ms). The first predetermined time period over which the first longitudinal acceleration may be between 200 ms and 800 ms (and may be around 400 ms).

The step of determining the second longitudinal acceleration may include applying a filter to the measurement taken over the second predetermined time period.

The method may further include a test pulse phase which includes applying multiple test braking pulses in a predetermined sequence. If an adjustment to the test braking pulse is required, the adjustment may be made at a predetermined position in the sequence and/or at the end of the test pulse phase.

An acceptable change in longitudinal acceleration may be within a predetermined range or by comparison to a predetermined threshold. If the modulus of the change in longitudinal acceleration is above the predetermined range or above the predetermined threshold, the test braking pulse may be adjusted to a lower level. If the modulus of the change in longitudinal acceleration is below the predetermined range or below the predetermined threshold, the test braking pulse may be adjusted to a higher level.

According to a second aspect of the invention we provide a method of stability control of a vehicle including using the method according to the first aspect and further including the steps of: measuring a lateral acceleration of the vehicle to determine a side of the vehicle on the inside of a turn, applying the first test braking pulse to a wheel on the inside of the vehicle, measuring the rotational speed of the wheel during the test braking pulse, calculating a change in rotational speed of the wheel during the test braking pulse, and performing a stability control intervention if the change in rotational speed of the wheel is above a predetermined threshold.

According to a third aspect of the invention we provide a method of stability control of a vehicle using the method according to the first aspect and further including the steps of: applying the first test braking pulse to a wheel on a first side of the vehicle and a second test braking pulse to a wheel on a second, opposite, side of the vehicle, measuring a change in the rotational speed of both wheels during the test braking pulse, calculating the difference between the change in rotational speed of the wheel on the first side and the change in rotational speed of the wheel on the second side of the vehicle, and performing a stability control intervention if the difference is above a predetermined threshold.

The method of adjusting the test braking pulses according to the first aspect may be implemented concurrently with the step of applying the test braking pulse to the wheel of the vehicle in the second or third aspects.

According to a fourth aspect of the invention we provide a system that is operable to perform the method of adjusting test braking pulses during stability control of a vehicle according to any of the first, second and third aspects of the invention.

Some embodiments are described by way of example only with reference to the following description and the appended figures, of which.

Embodiments of the invention are specifically for use in a vehicle 10 of the type including a towing vehicle 10a and a trailer 10b. The vehicle 10 may have an anti-lock braking system (ABS) which acts to prevent the vehicle brakes from locking. However, the vehicle 10 does not provide an indication of driver braking demand.

Figure 1:
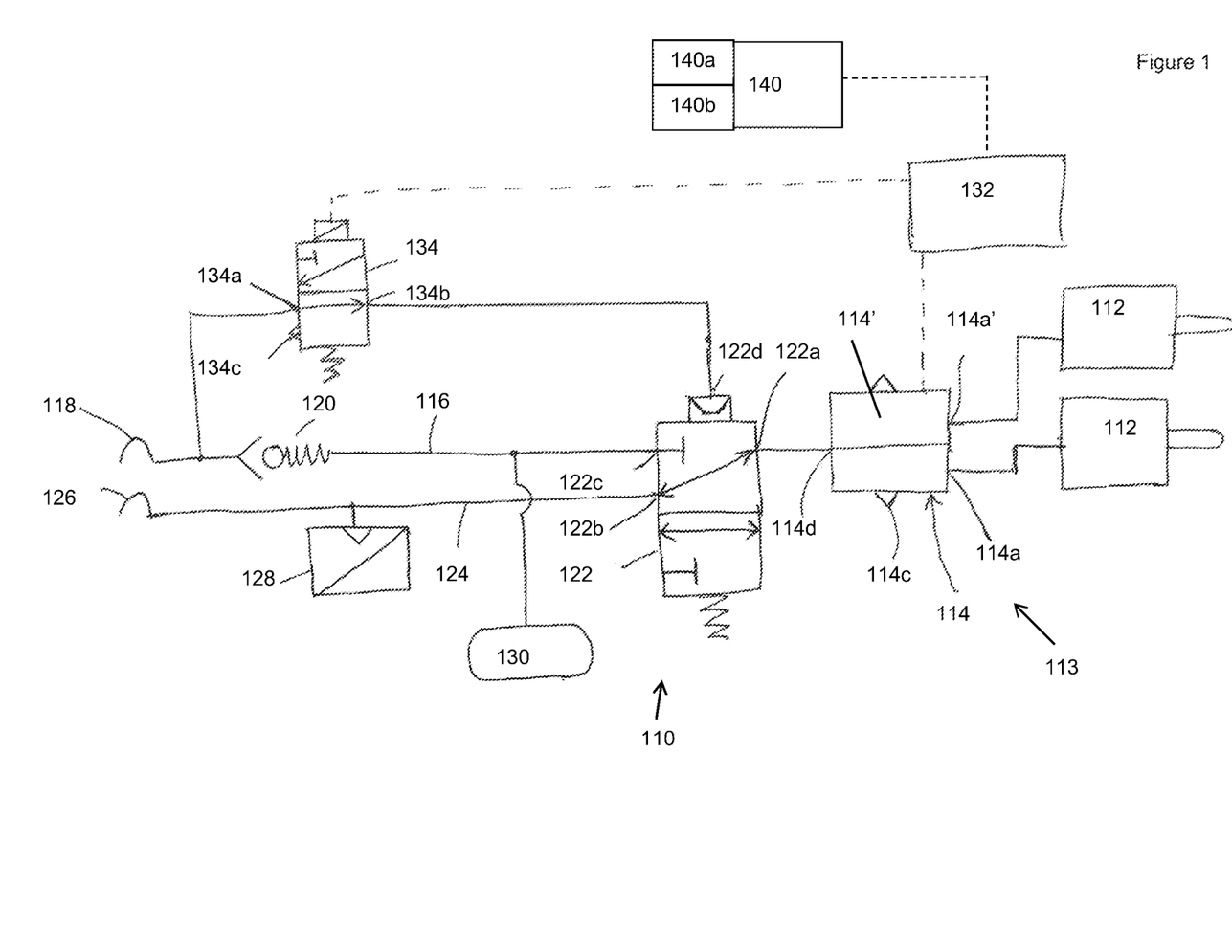
FIG. 1 is an illustration of a brake system.

In embodiments, the method of the present invention may be implemented in a trailer braking system 110 illustrated in FIG. 1. In this example, the trailer braking system 110 has at least one service brake actuator 112, a modulator valve assembly 113, a supply line 116, a supply connector 118, a non-return valve 120, an emergency apply valve 122, a control line 124, a control connector 126 and a braking ECU 132. In embodiments, the trailer braking system 110 may also have a pressure transducer 128 and/or a trailer pressurised fluid reservoir 130. Further details of the trailer braking system 110 are below.

The service brake actuator 112 is operable to apply a braking force to a wheel. Further service brake actuators 112 may be provided to apply a braking force to other wheels on the same side of the vehicle 10 and/or on an opposing side of the vehicle 10 (for example, two service brake actuators 112 are illustrated in FIG. 1, which may be on either side of the vehicle 10).

The service brake actuator 112 is connected to a delivery port 114a, 114a' of braking control valve assembly, which in this example, is an anti-lock braking system (ABS) modulator valve assembly 113. In the illustrated example, the ABS modulator valve assembly 113 includes two modulators 114, 114'. The ABS modulator valve assembly 113 includes two delivery ports 114a, 114a', an exhaust port 114c which is connected to a low pressure region (typically atmosphere), and a control port 114d.

In this example, both modulators 114, 114' are relay valves operable to move between a build position, a hold position and an exhaust position. In the build position, the respective delivery port 114a, 114a' is connected to a supply of pressurised fluid whilst the exhaust port 114c is closed. In the hold position, the delivery ports 114a, 114a', the exhaust port 114c, and the control port 114d are closed. In the exhaust position, the delivery port 114a, 114a' is connected to the exhaust port 114c.

In embodiments, each modulator 114, 114' has a control chamber which is connected to the control port 114d, and an electrically operable dump valve and hold valve. The modulator 114, 114' is configured such that, when there is no supply of electrical current to either the dump valve or the hold valve, the supply of pressurised fluid to the control chamber causes the modulator 114, 114' to move to the build position until the pressure at the delivery port 114a, 114a' is balanced with the pressure in the control chamber, at which point the modulator 114, 114' moves to the hold position. In other words, the pressure supplied to the brake actuator 112 is determined by the pressure at the control port 114d.

In some embodiments, the modulator 114, 114' is configured to move to the hold position when there is supply of electrical current to the hold valve but not to the dump valve, and to move to the exhaust position when there is supply of electrical current to the dump valve and to the hold valve. It should be appreciated that the modulators 114, 114' could equally be configured to adopt the exhaust position when there is supply of electrical current to the dump valve but not the hold valve.

It should be appreciated that the modulator details described above are for example only. Various configurations of this type of modulator suitable for use in ABS braking systems are well known to persons of skill in the art.

In some embodiments, when either of the modulators 114, 114' is in the build position, and when there is a fluid pressure at the control port 114d, pressurised fluid is transmitted to the respective service brake actuator 112. In more detail, the fluid enters a working chamber in the service brake actuator 112 and the service brake actuator 112 is configured to respond to this by actuating a brake to apply a braking force to its respective wheel.

When either of the modulators 114, 114' is in the exhaust position, pressurised fluid is exhausted from the respective service brake actuator 112. In more detail, the fluid is exhausted from the working chamber in the service brake actuator 112 and the service brake actuator 112 is configured to respond to this by releasing the braking force.

When either of the modulators 114, 114' are in the hold position, fluid pressure in the respective service brake actuator 112 is maintained. Thus, any braking force applied by the actuator 112 is held at a substantially constant level.

The emergency apply valve 122 includes an outlet 122a, a first inlet 122b, a second inlet 122c, and a control port 122d. The outlet 122a is connected to control port 114d of the modulator valve assembly 113. In this example, the first inlet 122b is connected to a control line 124, the second inlet 122c and the control port 122d are connected to a supply line 116.

In embodiments, the emergency apply valve 122 is a two position valve and is movable between a first position and a second position. In the first position (illustrated in FIG. 1), the first inlet 122b is connected to the outlet 122a whilst the second inlet 122c is closed. In the second position, the first inlet 122b is closed whilst the second inlet 122c is connected to the outlet 122a.

In embodiments, the emergency apply valve 122 is provided with resilient biasing element (for example, a spring) which urges the emergency apply valve 122 to the second position. The emergency apply valve 122 moves to the first position when the fluid pressure at the control port 122d is sufficient to overcome the biasing force of the biasing element.

In the present example, the supply line 116 is, in use, connected to a source of pressurised fluid (typically, compressed air). When the trailer 10b is pulled by a towing vehicle 10a the source of pressurised fluid is typically provided on the towing vehicle 10a, so the supply line 116 extends to a pneumatic or hydraulic supply connector 118 which is adapted, in use, to be connected to the source of pressurised fluid via a corresponding connector on the towing vehicle 10a.

In embodiments, a non-return (or one-way) valve 120 is provided in the supply line 116. The non-return valve 120 permits flow of fluid along the supply line 116 to the emergency apply valve 122 whilst preventing (or at least inhibiting) flow of pressurised fluid in the opposite direction from the emergency apply valve 122 to the supply connector 118.

In some embodiments, the control port 122d of the emergency apply valve 122 is connected to the supply line 116 upstream of the non-return valve 120. Therefore, the non-return valve 120 is located in the supply line 116 between the emergency apply valve 122 and the connection to the control port 122d.

In some examples, the control line 124 is connected to a source of a pressurised fluid braking demand signal. When the trailer 10b is pulled by a towing vehicle the pressurised fluid braking demand signal typically originates on the towing vehicle and is typically generated by a driver operating a foot pedal provided in the towing vehicle. In this example, the control line 124 extends to a pneumatic or hydraulic control connector 126. The control connector 126 is adapted, in use, to be connected to the source of pressurised fluid braking demand signal via a corresponding connector on the towing vehicle. In some embodiments, the brake system 110 includes an electrically operated brake apply valve 134. In this example, the brake apply valve 134 is provided in the line between the control port 122d of the emergency apply valve 122 and the supply line 116.

The brake apply valve 134 has an inlet 134a, an outlet 134b and an exhaust port 134c. The inlet 134a may be connected to the supply line 116. The outlet 134b may be connected to the control port 122d of the emergency apply valve 122. The exhaust port 134c may vent to a low pressure region (e.g. atmosphere).

In some embodiments, the brake apply valve 134 is movable between a first position (illustrated in FIG. 1) and a second positon. In the first position, the inlet 134a is connected to the outlet 134b. In the second position, the inlet 134a is closed and the outlet 134b is connected to the exhaust port 134c. In the present example, the brake apply valve 134 is provided with a resilient biasing element (e.g., a spring) which urges the valve 134 towards and into the first position. In some embodiments, the brake apply valve 134 includes an electrically operable actuator (for example, a solenoid or piezoelectric element) which, when supplied with electrical power, causes the brake apply valve 134 to move against the biasing element towards and into the second position.

In some embodiments, the electronic braking control unit (ECU) 132 controls operation of the electrically operable valves in the modulator valve assembly 113. Advantageously, the brake apply valve 134 may be electrically connected to the braking ECU 132, so that the braking ECU 132 also controls the supply of electrical power to the electrical actuator of the brake apply valve 134.

In some embodiments, a wheel speed sensor (not shown) is provided to monitor the speed of a wheel of the trailer 10b (it should be appreciated that more than one speed sensor could be employed to monitor the speed of more than one wheel of the vehicle 10).

In some embodiments, conventional anti-lock braking algorithms are employed to detect locking of the wheel. If wheel lock is detected, the braking ECU 132 controls the electrically operable valves associated with one or both modulators 114, 114' so that it moves to either the hold position or the exhaust position in accordance with standard ABS control procedures. For example, the electrical power may be momentarily supplied to one or both of the dump valves to release the applied brake pressure, and/or electrical power supplied to one or both of the hold valves to hold the applied brake pressure.

It should be appreciated that, that by having two modulators 114, 114', independent ABS control of the braking force applied by multiple service brake actuators 112 is possible. The modulator valve assembly 113 could include only one modulator, but independent control of the braking force applied by each brake actuator 112 would not be possible, and any ABS intervention would be applied equally to all connected wheels.

The vehicle 10 is equipped with an accelerometer assembly 140 which is configured to provide data relating to/indicative of the acceleration of the vehicle 10. The accelerometer assembly 140 is connected to the braking ECU 132. The accelerometer 140 includes a lateral acceleration sensor 140a (which can be used, for example, to detect when the vehicle 10 is turning) and a longitudinal acceleration sensor 140b (which can be used, for example, to detect when the vehicle 10 is accelerating forward or braking).

In some embodiments, the trailer braking system 110 includes a pressurised fluid reservoir 130 (i.e. a fluid reservoir on the trailer 10b), which may be connected to the supply line 116 downstream of the non-return valve 120.

Details of how the trailer braking system 110 operates will now be described. During normal use, no electrical power is supplied to the brake apply valve 134, and the braking system 110 adopts the configuration illustrated in FIG. 1. Fluid pressure in the supply line 116 causes the emergency apply valve 122 to move against the biasing force of its biasing element into the first position of the emergency apply valve 122. Thus, any fluid pressure braking demand signal generated by driver demand for braking flows to the service brake actuator 112 via the emergency apply valve 122 and the modulator valve assembly 113. The fluid pressure at the service brake actuator 112 causes it to move to the brake apply position. Therefore, a braking force is applied to the respective wheel.

In some embodiments, when electrical power is supplied to the brake apply valve 134, the brake apply valve 134 moves against the biasing force of its biasing element into its second position. The control port 122d of the emergency apply valve 122 is vented to atmosphere, and so the emergency apply valve 122 moves under the influence of its biasing element to its second position. Further in this example, the control port 114d of the modulator valve assembly 113 is connected to the trailer reservoir 130. The pressurised fluid is supplied to the brake actuator 112 which applies a braking force to the trailer 10b (this is the same action that occurs under emergency braking conditions). The braking ECU 132 may be operated, if desired, to provide conventional anti-lock protection to wheels during the braking event.

When braking is no longer required, the supply of electrical power to the brake apply valve 134 is ceased, and the brake apply valve 134 and emergency apply valve 122 move back under the influence of their biasing elements to their first positions. In some embodiments, the ECU 132 is programmed to operate the electrically operable valves of the modulator valve assembly 113 to the exhaust position (and therefore, vent fluid pressure from the brake actuator 112). The applied brake pressure is released by the supply of electrical current to the dump valve and hold valve associated with each modulator 114, 114' (causing the brakes to release).

If the supply connector 118 becomes disconnected from its connection to the supply of pressurised fluid, the portion of the supply line 116 up-stream of the non-return valve 120 is exhausted to atmosphere. The resulting loss of fluid pressure at the control port 122d of the emergency apply valve 122 causes it to move under the action of its biasing element to its second position. The control port 114d of the modulator valve assembly 113 is connected to the trailer pressurised fluid reservoir 130. For example, the pressurised fluid from the reservoir 130 travels to the brake actuator 112 to apply a braking force to the trailer 10b. In other words, the trailer braking system 110 provides for automatic application of the service brake in the event that the trailer 10b becomes disconnected from its normal supply of pressurised fluid.

The braking ECU 132 may operate to provide conventional ABS control in the event of wheel slip during this emergency braking. The addition of the brake apply valve 134 thus means that the ABS trailer braking system can be used in conjunction with a stability control system without the need to provide full electronic braking system (EBS) control.

The trailer braking system 110 may also be operated to apply a braking force to the trailer 10b, when the supply line 116 is connected to a supply of pressurised fluid and when there is no driver demand for braking.

For example, the vehicle 10 may have a stability control system for assessing the likelihood of the vehicle 10 becoming unstable. Preferably, such a control system operates while the vehicle 10 is cornering in order to assess the risk of the vehicle 10 overturning. The stability control system may intervene in the event that a risk of instability and/or overturning is detected. In other words, if the stability control system decides that the stability of the vehicle 10 is compromised and that braking of the vehicle 10 is required.

In embodiments, the stability control system makes an assessment of the stability of the vehicle 10 by assessing whether one or more wheels on the inside of a corner around which the vehicle 10 is travelling has unloaded. If a wheel unloads, weight has been lifted from the wheel which may result in the wheel having a lower frictional engagement with the road surface. This results in a wheel that may be more likely to slip or lock during braking and in extreme cases may indicate that the vehicle 10 is at risk from overturning.

In embodiments, the stability control system may measure a lateral acceleration of the vehicle 10, in order to determine a side of the vehicle 10 on the inside of the corner. Once, the stability control system has determined which way the vehicle 10 is turning, a first test braking pulse is applied to a wheel on the inside of the vehicle 10. Ideally, the test braking pulse applies only a low level of braking force to the wheel, such that the test braking does not have any appreciable effect on the speed of a wheel travelling on a surface with good contact, but would cause a significant reduction in the speed of a wheel which has partially or fully lifted off the road surface.

The rotational speed of the wheel (to which the braking test pulse is applied) is measured during the test braking pulse. The rotational speed of the wheel when the test braking pulse is not being applied is obtained. In some embodiments, the rotational speed of the wheel when the test braking pulse is not applied is measured immediately before the test braking pulse is applied.

The stability control system calculates the change in rotational speed of the wheel during the test braking pulse (in other words, a calculation of the effect on the rotational speed of the wheel due to the test braking pulse is made). If the change in rotational speed is unacceptable (for example, the modulus of the change in rotational speed exceeds a predetermined threshold), then the stability control system performs a stability control intervention. In some embodiments, an intervention involves one or more of an alert made to the driver, an automatic braking procedure, an automatic throttling of the engine, etc.

Figure 2:
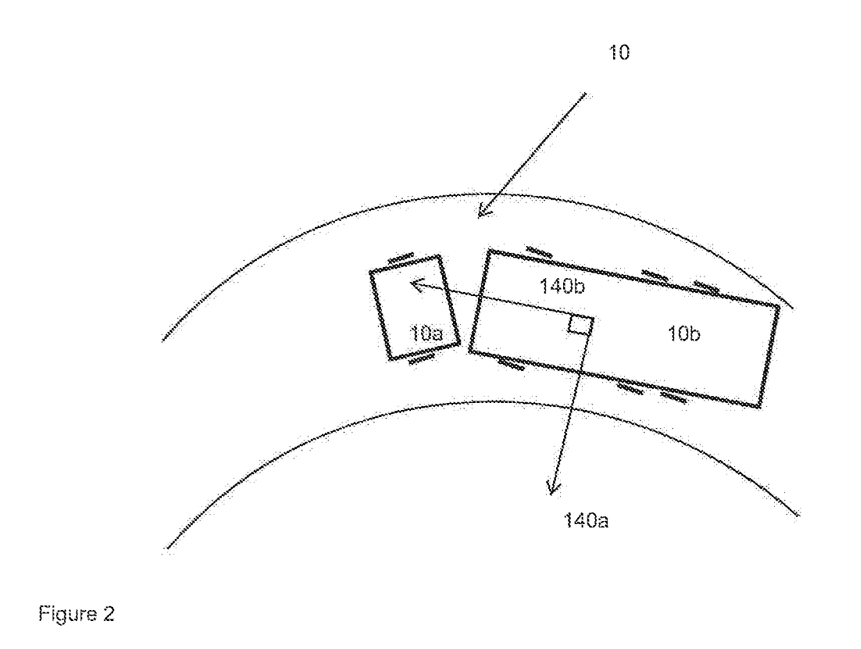
FIG. 2 is a schematic of a vehicle cornering.

In some embodiments, the method for assessing the stability of the vehicle 10 includes applying the first test braking pulse to a wheel on a first side of the vehicle 10 and a second test braking pulse to a wheel on a second, opposite, side of the vehicle 10 (step 22 in FIG. 2). In this example, the change in rotational speed during the test braking pulses is measured for the wheels on both the first and second sides of the vehicle 10. The difference between the first and second sides of the vehicle 10 is calculated. In other words, the difference between the change in rotational speed of the wheel on the first side and the change in rotational speed of the wheel on the second side of the vehicle 10 is calculated (step 24 in FIG. 2). If the difference between the change in rotational speed on one side and the change in rotational speed on the other side is more than a predetermined threshold (step 26 in FIG. 2) then the stability control system will perform an intervention (which may involve one or more of the examples discussed above).

The method outlined above may involve using the trailer braking system 110 described above. The ECU 132 is programmed such that when the lateral acceleration of the vehicle (Aw) exceeds a predetermined value ($A_{lat.thresh}$) then the ECU can make a decision about whether the vehicle 10 is turning and optionally, make an assessment of which side of the vehicle 10 is on the inside of the bend (step 20 on FIG. 2). The ECU 132 supplies a pulse of electrical power to the brake apply valve 134. This causes pressurised fluid to be supplied to the brake actuators 112 via the modulator valve assembly 113. During this time, the wheel speed sensors are used to measure the speed the (or each) braked wheel and to generate appropriate wheel speed signals.

It should be appreciated that the supply of electrical power to the brake apply valve 134 causes the modulator valve assembly 113 to be connected to fluid at reservoir pressure (which could result in maximum braking force being applied to the wheel(s)). Maximum braking is not required for the test braking pulse, so the ECU 132 is programmed to switch on the hold valves (to hold the braking pressure) after a first time interval (i.e. a predetermined time period that is sufficient to allow the pressure in the control chamber of the modulator valve assembly 113 to build up to an appropriate level to apply a low level braking force to the wheel(s)). It will be appreciated that the control line between the emergency valve 122 and the control port 114d will continue to increase to the available reservoir pressure, whilst the control port 114d is closed.

In some embodiments, the ECU 132, after a second time interval, ends the test braking pulse by supplying electrical power to the dump valves of the modulators 114, 114' to release the braking pressure. The hold valves may remain energised until such time as the ECU 132 is ready to switch off the electrical power supply to the brake apply valve 134 and exhaust the control line 124.

In some embodiments, the presence of wheel lift is detected by comparison of the effect of the test braking pulse on a wheel on a first side of the vehicle 10 with the effect of the test braking pulse on a wheel on a second side of the vehicle 10. In some examples, the ECU 132 is programmed to calculate the change in wheel speed during the test braking pulse for each of the braked wheels ($\Delta V_a$, $\Delta V_b$), and then to calculate the magnitude of the difference between the change in wheel speed for the braked wheel at the first side of the vehicle 10 and the change in wheel speed for the braked wheel at the second side of the vehicle 10. The ECU 132 then compares this difference with a predetermined threshold difference ($\Delta V_{diff}$). If the difference is low, then any change in wheel speed during the test braking is happening on both sides of the vehicle 10, and therefore can be attributed to (normal) deceleration of the vehicle 10, or if the vehicle 10 is travelling on a low friction surface, wheel slip, resulting from the application of a higher than ideal level of braking force during the test braking. If the difference is large, it is likely that the greater change in wheel speed on one side of the vehicle 10 only can be attributed to lifting of the wheel on that side of the vehicle 10.

If the difference is less than the threshold difference, it is assumed that there is no wheel lift, and so no intervention is required. The ECU 132 is programmed to switch off the electrical power supply to the brake apply valve 134, and then to operate the modulators 114, 114' to return them to the build position (in this example, by switching off electrical power supply to the dump and hold valves). The portion of the control line 124 between the control port 114d of the modulator valve assembly 113 and the emergency apply valve 122 is then connected to the towing vehicle 10a via the portion of the control line 124 between the towing vehicle 10a and the emergency apply valve 122, and vents to atmosphere at the towing vehicle 10a.

If the difference is greater than the threshold difference, the ECU 132 is programmed to initiate a stability control intervention. In embodiments, if wheel lift is detected, a braking intervention is initiated. The modulators 114, 114' are returned to the build position (by switching off the supply electrical power to the dump and hold valves) so that the brake actuator 112 applies a braking force to the wheel and slow the vehicle 10 down.

It will be appreciated, however, that the control intervention could comprise other means of reducing the vehicle speed, such as throttling the vehicle engine. Alternatively, if wheel lift is detected, the ECU 132 may be programmed to generate a rollover alarm signal, which may comprise an audible or visual alarm or both, to alert the driver that braking is required to reduce the vehicle speed, and hence avoid rollover.

Braking force may be applied by a service brake actuator 112 on both sides of the vehicle 10. In some embodiments, the ECU 132 may determine the direction of turning of the vehicle 10 from the accelerometer assembly 140, and supply electrical power to the dump and/or hold valve controlling the modulator 114, 114' associated with the wheel on the inside of the turn (i.e. the lifting wheel) to move that modulator 114, 114' to the exhaust and/or hold position. Thus, no braking force is applied to the wheel on the inside of the turning curve. In other words, the ECU 132 may redistribute the braking force to only wheels that are in good contact with the ground surface (e.g. the wheels that do not show a big difference in rotational speed when the test braking pulse is applied).

Also, the ECU 132 may be programmed to monitor the lateral acceleration of the vehicle 10 during the stability control intervention and stop the intervention when the risk of instability is reduced to an acceptable value. In other words the brake pressure may be released when the lateral acceleration ($A_{lat}$) falls below a second threshold lateral acceleration ($A_{lat.thresh2}$). Such a second threshold lateral acceleration may be equal to or different from the threshold lateral acceleration ($A_{lat.thresh}$) used prior to initiating the test braking.

The second threshold lateral acceleration may, for example, be set as a predetermined percentage of the lateral acceleration $A_{lat}$ detected just prior to initiation of the test braking. The electrical power supply to the brake apply valve 134 may be switched off to connect the portion of the control line 124 between the control port 114d of the modulator valve assembly 113 and the emergency apply valve 122 to the towing vehicle 10a via the portion of the control line 124 between the towing vehicle 10a and the emergency apply valve 122 (thus exhausting the control line 124).

In some embodiments, the ECU 132 is programmed to return the modulators 114, 114' to the build position.

The second time interval (i.e. the time after which the test braking pressure is released) may be fixed. In embodiments where the ECU 132 applies test braking pulses to both sides of the vehicle 10, the second time interval is variable depending on the initial reaction of the wheel speeds on the two sides of the vehicle 10. For example, if an equal test braking pulse on both sides of the vehicle 10 causes an equal reaction on both sides even though the vehicle 10 is cornering with relatively high lateral acceleration, the vehicle 10 may be unladen or the road may be damp. In these cases, it is much less likely that the vehicle 10 will roll, so the test braking pulse need not be applied for very long. If, however, the inside wheels show a greater reaction than the outer wheels then the test braking pulse may be applied for longer to see if a wheel lift condition develops. In some embodiments, the ECU 132 may be programmed to terminate the test braking pulse if it is determined that the difference in wheel speed after a predetermined length of time (e.g. 200 ms) is below a predetermined threshold level, or to continue the test braking pulse for longer (e.g. up to 600 ms) if it is determined that the difference in wheel speed after a predetermined length of time is above a predetermined threshold level.

In some embodiments (i.e. where a pressure sensor 128 is provided in the control line 124), the fluid pressure in the control line 124 is transmitted to the ECU 132 by the pressure sensor 128. It will be appreciated that, if there is driver demand for braking, the fluid pressure in the control line 124 will increase to a level indicative of the level of braking force required. The ECU 132 is programmed to monitor that signal, and if there is driver demand for braking (detected by the pressure sensor 128 as an increase in fluid pressure) during a test braking pulse, to assess if the braking force demanded by the driver is lower or higher than the test braking pulse level. If it is lower, the ECU 132 is programmed to continue with the test braking pulse. If it is higher, however, the ECU 132 is programmed to operate the modulators 114, 114' to hold the test braking pressure whilst de-energising the brake apply valve 134. This connects the control port 114d to the control line 124, and allows the excess pressure in the control line between the control port 114d and the emergency apply valve 122 to dissipate along the entire length of the control line 124 to the towing vehicle. The braking demand pressure is therefore supplied to the control port 114d.

The braking demand pressure in the control line 124 is passed to the brake actuator 112. In such an example, the test braking pressure is therefore increased to the level of braking demand set by the driver.

In some embodiments, the ECU 132 may be programmed to perform the same monitoring of the wheel speeds as it does during a normal test braking pulse. Alternatively, the ECU 132 may cease this monitoring, and permit the braking as a normal driver demanded braking event, (for example, if the driver demand exceeds a predetermined level).

If the ECU 132 determines that, despite the driver demand for braking, there is wheel lift, full reservoir pressure may be applied to the brake associated with the wheel on the outside of the turn only (i.e. the non-lifting wheel) as described above (assuming the resulting overall braking effect is more than that achievable by allowing the driver demanded brake pressure to continue to all wheels). If the system is demanding stability control braking but the driver demanded braking is permitted instead, and that level of driver demanded braking reduces then the ECU 132 may switch from driver demand to autonomous braking again (by re-energising the brake apply valve 134).

Various modifications may be made to the braking system whilst operating the method according to the invention.

In some embodiments, the ECU 132 may be programmed to use the lateral acceleration signal to determine which way the vehicle 10 is turning, and to calculate the difference $\Delta V_{diff}$ by subtracting the speed change of the wheel at the outside of the turn from the speed change of the wheel at the inside of the turn.

In some embodiments, the ECU 132 may be programmed to deactivate its normal ABS functionality during test braking.

The trailer braking system 110 may be provided with more brake actuators 112. In this case, the ECU 132 may be programmed to calculate $\Delta V_{diff}$ for multiple pairs of wheels (e.g. a pair including one wheel on the first side of the vehicle 10 and one wheel on the second side of the vehicle 10) and to initiate a stability control intervention if the $\Delta V_{diff}$ exceeds the threshold level for any of the wheel pairs. Alternatively, it may be programmed to only carry out the comparison for one predetermined pair of wheels.

Since the above stability control system can be implemented in a vehicle 10 that has an ABS but does not have an EBS (electronic braking system), the stability control system may not have any knowledge of the braking force demanded/being applied to the wheels (i.e. if the driver were applying the brakes himself). The pressure sensor 128 may not be present or may not provide an accurate assessment of the braking force being applied (often the pressure sensor 128 is used only to provide an indication of whether a brake pressure is applied rather than an indication of the exact pressure developed). Further, even if the pressure sensor 128 provides an indication of the brake pressure applied to the brakes, this is not a direct indication of the change in acceleration experienced by the vehicle.

As discussed above, the "normal" level of the test braking pulse is low (and usually around 100 kPa). There are instances where the test braking pulse level may be provided at a level that is not ideal for the stability assessment of the vehicle 10. If the first time interval set in the ECU 132 for leaving the modulators 114, 114' (the modulator valve assembly 113) to build pressure to apply the brake actuators 112 is an inappropriate amount of time for the conditions in which the vehicle 10 is operating this may result in a test pulse that is lower or higher than is ideal. If the test pulse is lower than intended, the method for determining the stability of the vehicle 10 may not provide accurate information (or the information may not be as accurate as it could be). If the test pulse is higher than ideal, then the test brake pulse may jolt the vehicle that can be felt by the driver and/or actually cause the vehicle 10 to decelerate before any assessment has been made on whether an intervention is required (which may make the driving experience uncomfortable and/or alarming).

There are several factors which can impact on the amount of time needed to build the appropriate brake pressure. Vehicle or load specific factors, such as the characteristics of the brake actuators—e.g. size of the chambers/actuators, pressure versus torque response and other technical details (which often the main vehicle system does not have information about), brake adjustment and the load on the axle may impact the brake force developed (at the tyre/road interface). Environmental factors, such as temperature, altitude, surface incline may all have an impact (but they may or may not impact across the entire journey of the vehicle—for example, the vehicle may not experience the same incline, temperature or altitude for the entire journey. However, these environmental factors are likely to have less impact than the vehicle/load factors discussed above. It should be appreciated that vehicle/load factors could change with every journey and as such it is beneficial to have a system that can calibrate the appropriate amount of time (i.e. the first time interval and/or the second time interval) to build the test braking pulse as desired (e.g. for each new journey/new load/etc.).

Where the driver is already applying the brakes, a test braking pulse at a normal level may have a reduced or no effect on the rotational speed of the wheel or wheels, so the test to assess the stability of the vehicle 10 may become inaccurate. In some embodiments, depending on the level of driver brake demand, the size of the test pulse may be reduced (as the wheel data from the driver demand may be used instead) and/or the method according to the invention may be implemented for just for a single test braking pulse/test braking pulse phase (i.e. any adjustment to the test braking pulse level may not be saved for a later test braking phase but may just be implemented for the immediate situation and not used again). Alternatively, the test braking pulse may not be applied at all and stability control may be disabled completely for a short period of time.

If there is no braking force already being applied, a "normal" test braking pulse can be applied. In this case a method according to the invention can be applied to assess the level of test braking pulse that is applied and if any adjustment is required. That adjustment can be stored for subsequent test braking pulses.

It should be appreciated that when an adjustment to the level of the test braking pulse is discussed this usually entails adjusting the length of the first and/or second time intervals, which allow the appropriate pressure to build and be applied to the wheel. In effect, the method according to the invention provides a calibration method that allows the system to adjust the level of the test braking pulse. Such an adjustment may be used for the remainder of a journey or another predetermined time and provides a calibration for this specific journey/vehicle/set of brake actuators/any other factor that may affect the brake level developed.

If the test braking pulse should be adjusted to a lower level, the first time interval may be shortened (so that less pressure is permitted to build) and/or the second time interval may be shortened (so that the pressure is applied in the brake actuator 112 for a shorter time). Conversely, if the test braking pulse should adjusted to a higher level, the first and/or the second time intervals may be increased.

Figure 4:
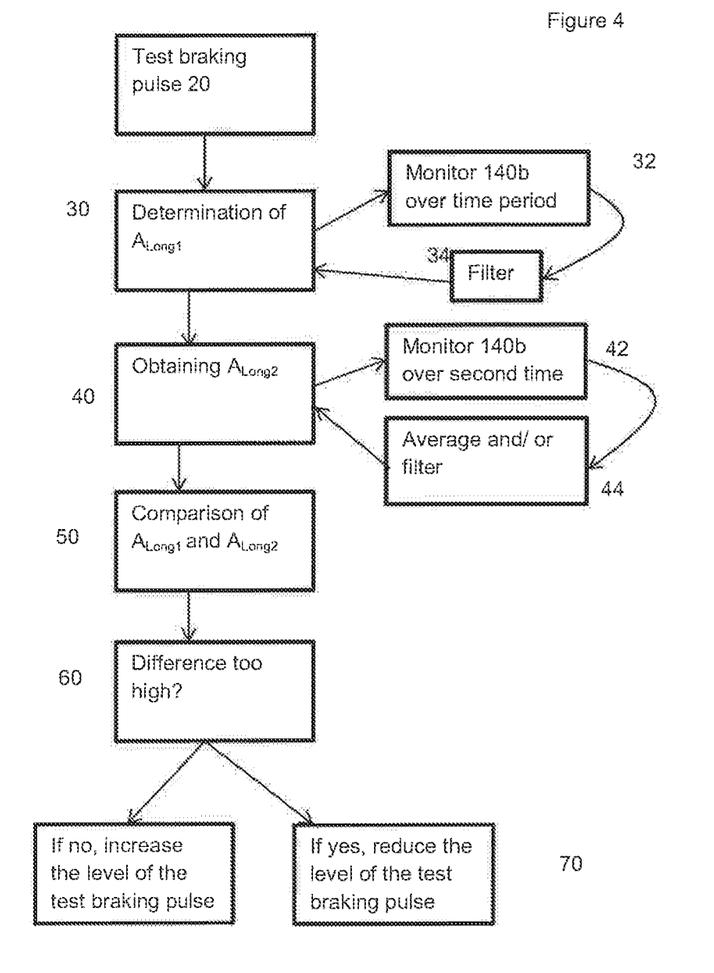
FIG. 4 is a flow diagram illustrating specific steps of the method in more detail.

Thus, a stability control system that includes an adjustment method 30 according to the present invention is beneficial (the steps are illustrated in FIG. 4). The method provides a way in which to adjust the level of the test braking pulse. Any adjustment required as a result of the adjustment method 30 may be implemented immediately or at a predetermined time in future (for example, for subsequent test braking pulses (i.e. those applied in subsequent assessments of vehicle 10 stability) and may be remembered (and implement/used) for a predetermined amount of time and/or testing cycles.

The method includes the steps of: applying a first test braking pulse to at least one wheel of the vehicle 10 (step 20), determining a first longitudinal acceleration $A_{Long1}$ of the vehicle 10 during the test braking pulse (step 32), obtaining a second longitudinal acceleration indicative of the longitudinal acceleration of the vehicle 10 when a test braking pulse is not being applied (step 40), calculating a change in longitudinal acceleration during the test braking pulse (step 50), determining whether the change in longitudinal acceleration is acceptable (step 60), and if not, adjusting the level of the braking pressure applied in a subsequent test braking pulse (step 70).

Figure 3:
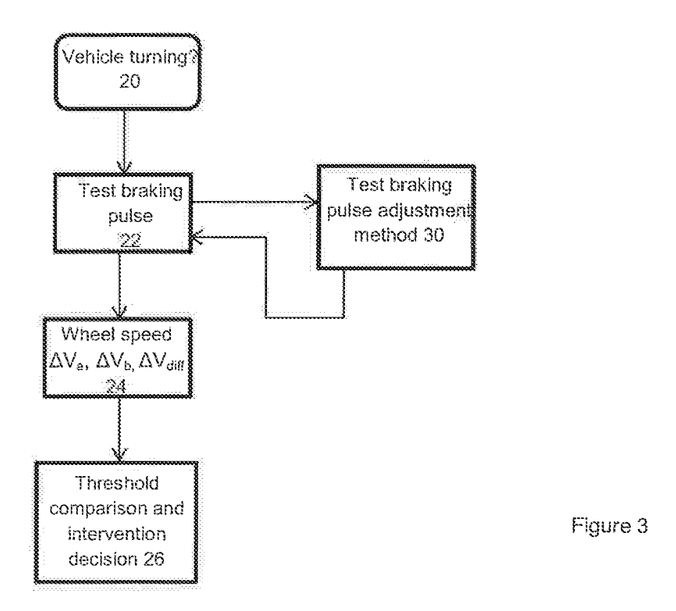
FIG. 3 is a flow diagram illustrating steps of a stability control method.

The step of applying a first test braking pulse to at least one wheel of the vehicle may be the same test braking pulse that is described above in relation to the method to assess the stability of the vehicle 10 (this is illustrated by step 20 in FIGS. 3 and 4). This may allow the ECU 132 to assess both the stability of the vehicle 10 and whether the level of the test braking pulses are at an appropriate level concurrently (but it should be appreciated that this is not mandatory).

The first longitudinal acceleration $A_{Long1}$ of the vehicle 10 during the test braking pulse may be determined by obtaining data from the accelerometer assembly 140. The longitudinal acceleration sensor 140b provides an indication of the acceleration/deceleration of the vehicle 10 in the forwards/backwards direction of the vehicle 10. In this case, the measurement is made while the test braking pulse is being applied. In some embodiments, determination of the first longitudinal acceleration $A_{Long1}$ involves measuring the longitudinal acceleration of the vehicle 10 over first predetermined time period (step 32). For example, the first longitudinal acceleration $A_{Long1}$ may be measured for between 200 ms and 800 ms (and more preferably about 400 ms). Measuring over such a range may increase the chance that a measurement of any disturbance in the longitudinal acceleration of the vehicle 10 is captured. In some embodiments, the longitudinal acceleration measured during the test braking pulse may have a filter applied to it to reduce noise (step 34). It should be appreciated that a filter may be counterproductive because removing actual mechanical noise is difficult while maintaining information in the signal that is important (i.e. the indication that there may be some disturbance in the acceleration of the vehicle 10). Thus, any filtering and/or manipulation must be considered carefully.

The second longitudinal acceleration $A_{Long2}$ is obtained, which is indicative of the longitudinal acceleration of the vehicle 10 when a test braking pulse is not being applied (step 40). The second longitudinal acceleration $A_{Long2}$ is measured at a time when the test braking pulse is not being applied and provides an indication of the acceleration/deceleration of the vehicle that was being experienced before/after the test braking pulse was applied. In other words, the second longitudinal acceleration $A_{Long2}$ provides a reference value. This permits the first longitudinal acceleration $A_{Long1}$ to be compared to the "reference value" in order to assess whether the longitudinal acceleration of the vehicle 10 is disturbed during the test braking pulse. In some embodiments, determination of the second longitudinal acceleration $A_{Long2}$ involves measuring the longitudinal acceleration of the vehicle 10 over second predetermined time period (step 42). For example, the second longitudinal acceleration $A_{Long2}$ may be measured for between 200 ms and 800 ms (and more preferably about 600 ms).

In some embodiments, the step of obtaining the second longitudinal acceleration $A_{Long2}$ involves taking the longitudinal acceleration of the vehicle either a short time/immediately before or a short time/immediately after the test braking pulse has been applied. For example, the second longitudinal acceleration may be obtained within 1 s of the test braking pulse being applied (either before or after).

The longitudinal acceleration sensor 140b may provide a relatively noisy output of the longitudinal acceleration of the vehicle 10. Therefore, it may be beneficial in some embodiments, to calculate an average longitudinal acceleration over the second predetermined time period (step 44). In some embodiments, a filter may be applied to the measurement of the longitudinal acceleration over the second predetermined time period (step 44). One or both of these treatments may provide a better indication of the reference value of the longitudinal acceleration of the vehicle 10.

Examples of appropriate treatment may involve taking an average from the measurement taken or may involve assessing all the samples taken over a time period and removing the highest and lowest values (as outlying data that is not trusted) followed by taking an average. Alternatively, a Kalman filter or similar may be implemented to attempt to identify the parts of the signal/measurement which are due to noise or other background sources.

In some embodiments, the second predetermined time period (i.e. the time over which the second longitudinal acceleration is measured) is longer than the first predetermined time period (i.e. the time over which the first longitudinal acceleration is measured). In other words, it may be beneficial to measure the longitudinal acceleration value providing the reference or baseline value over a longer period of time than the value that indicates whether there has been a disturbance in the longitudinal acceleration during the test braking pulse (as this allows a better/more reliable assessment of the acceleration).

A change in longitudinal acceleration during the test braking pulse (step 50) is determined. In other words, the reference value provided by the second longitudinal acceleration $A_{Long2}$ is compared against the first longitudinal acceleration $A_{Long1}$, which indicates the change in longitudinal acceleration experienced by the vehicle 10 during the test braking pulse. The ECU 132 makes a determination on whether the change in longitudinal acceleration is acceptable (step 60). If the change is not acceptable, the ECU 132 adjusts the level of the braking pressure applied in a subsequent test braking pulse (step 70). In reality, the ECU 132 may not be able to affect the test braking pulse level directly—however, it can adjust the length of the first time interval that the ECU 132 allows the modulators 114, 114' to build. Hence, the level of the test braking pulse will be affected by a change in the amount of time the fluid pressure is allowed to build up resulting in an altered/adjusted brake pressure applied at the brake actuator 112.

In some embodiments, an acceptable change in longitudinal acceleration is deemed to be within a predetermined range. Alternatively, an acceptable change in longitudinal acceleration may be made by comparison to a predetermined threshold.

In some embodiments, if the modulus of the change in longitudinal acceleration is above the predetermined range or above the predetermined threshold, the test braking pulse is adjusted to a lower level. In other words, if the change in longitudinal acceleration experienced by the vehicle 10 during the test braking pulse is more than is acceptable (i.e. the change is at a level that may be felt by the driver or than is necessary in order to provide a reliable assessment of the vehicle stability 10) then the test braking pulse level will be reduced for subsequent test braking pulses.

In some embodiments, if the modulus of the change in longitudinal acceleration is below the predetermined range or below the predetermined threshold, the test braking pulse is adjusted to a higher level. In other words, if the change in longitudinal acceleration experienced by the vehicle 10 during the test braking pulse is less than is acceptable (i.e. for providing an accurate and/or reliable assessment of the stability of the vehicle 10) then the test braking pulse level will be increased for subsequent test braking pulses.

The method may further include applying multiple test braking pulses in a predetermined sequence to form a test pulse phase. In some embodiments, in the event that an adjustment to the level of the test braking pulse is required, the adjustment is made at a predetermined position in the sequence and/or at the end of the test pulse phase.

In some embodiments, the ECU 132 is programmed to carry out the normal ABS monitoring and control procedures during the stability control assessments and braking intervention, i.e. to release/hold the braking pressure in accordance with conventional ABS algorithms if wheel slip is detected.

When used in this specification and claims, the term "line" covers any type of conduit for pressurised fluid including a passage or bore through a housing, a hose, pipe or tube. It should also be appreciated that, whilst in this example, the modulator valve assembly 14 may be connected to more than one brake actuator.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A method of adjusting a test braking pulse used for stability control of a vehicle during a subsequent period of rollover assessment of the vehicle, including the steps of:
    applying a first test braking pulse to at least one wheel of the vehicle, the application of the test braking pulse comprising operating a brake actuator via an ABS to apply a low level braking pressure of the wheel,
    determining a first longitudinal acceleration of the vehicle during the test braking pulse,
    obtaining a second longitudinal acceleration indicative of the longitudinal acceleration of the vehicle when the test braking pulse is not being applied, to provide a reference value,
    calculating a change in longitudinal acceleration during the test braking pulse by comparing the first longitudinal acceleration against the reference value, and
    determining; whether the change in longitudinal acceleration during the test braking pulse is acceptable and if not, adjusting the level of the braking pressure applied in a subsequent test braking pulse;
    wherein the step of determining the first longitudinal acceleration includes measuring the longitudinal acceleration of the vehicle over a first predetermined time period and the step of determining the second longitudinal acceleration includes measuring the longitudinal acceleration of the vehicle over a second predetermined time period, wherein the second predetermined time period over which the second longitudinal acceleration is measured is longer than the first predetermined time period over which the first longitudinal acceleration is measured such that the second longitudinal acceleration defines the reference value to assist in comparing the first longitudinal acceleration against the reference value while calculating the change in longitudinal acceleration for the rollover assessment.

2. A method of adjusting a test braking pulse according to claim 1 wherein the step of obtaining the second longitudinal acceleration includes a step of determining the longitudinal acceleration either before or after the test braking pulse has been applied.

3. A method of adjusting a test braking pulse according to claim 2 wherein the step of determining the second longitudinal acceleration is performed within Is of the test braking pulse being applied.

4. A method of adjusting a test braking pulse according to claim 2 wherein the step of determining the second longitudinal acceleration includes calculating an average longitudinal acceleration over the second predetermined time period.

5. A method of adjusting a test braking pulse according to claim 4 wherein the second predetermined time period is between 200 ms and 800 ms.

6. A method of adjusting a test brake pulse according to claim 5, where the second time period is 600 ms.

7. A method of adjusting a test braking pulse according to claim 2 wherein the first predetermined time period over which the first longitudinal acceleration is measured is between 200 ms and 800 ms.

8. A method of adjusting a test brake pulse according to claim 7, wherein the first predetermined time is 400 ms.

9. A method of adjusting a test braking pulse according to claim 2 wherein the step of determining the second longitudinal acceleration includes applying a filter to the measurement taken over the second predetermined time period.

10. A method of adjusting a test braking pulse according to claim 1 further including a test pulse phase which includes applying multiple test braking pulses in a predetermined sequence.

11. A method of adjusting a test braking pulse according to claim 10 wherein if an adjustment to the test braking pulse is required, the adjustment is made at a predetermined position in the sequence and/or at the end of the test pulse phase.

12. A method of adjusting a test braking pulse according to claim 1 wherein an acceptable change in longitudinal acceleration is within a predetermined range or by comparison to a predetermined threshold.

13. A method of adjusting a test braking pulse according to claim 12 wherein if the modulus of the change in longitudinal acceleration is above the predetermined range or above the predetermined threshold, the test braking pulse is adjusted to a lower level.

14. A method of adjusting a test braking pulse according to claim 12 wherein if the modulus of the change in longitudinal acceleration is below the predetermined range or below the predetermined threshold, the test braking pulse is adjusted to a higher level.

15. A method of carrying out stability control of a vehicle including using the method of claim 1 and further including the steps of:
    measuring a lateral acceleration of the vehicle to determine a side of the vehicle on the inside of a turn,
    applying the first test braking pulse to a wheel on the inside of the vehicle,
    measuring the rotational speed of the wheel during the test braking pulse, calculating a change in rotational speed of the wheel during the test braking pulse, and performing a stability control intervention if the change in rotational speed of the wheel is above a predetermined threshold.

16. A method of carrying out stability control of a vehicle using the method of claim 1 and further including the steps of:
    applying the first test braking pulse to a wheel on a first side of the vehicle and a second test braking pulse to a wheel on a second, opposite, side of the vehicle, measuring a change in the rotational speed of both wheels during the test braking pulse, calculating the difference between the change in rotational speed of the wheel on the first side and the change in rotational speed of the wheel on the second side of the vehicle, and performing a stability control intervention if the difference is above a predetermined threshold.

17. A method of carrying out stability control of a vehicle according to claim 15 wherein the method of adjusting the test braking pulses is implemented concurrently with the step of applying the test braking pulse to the wheel of the vehicle.

18. A system that is operable to perform the method of adjusting test braking pulses according to claim 1.

* * * * *